Aug. 1, 1933.                G. E. POGGEL                1,920,915
                              DEHUMIDIFIER
                        Filed Feb. 25, 1930           3 Sheets-Sheet 1
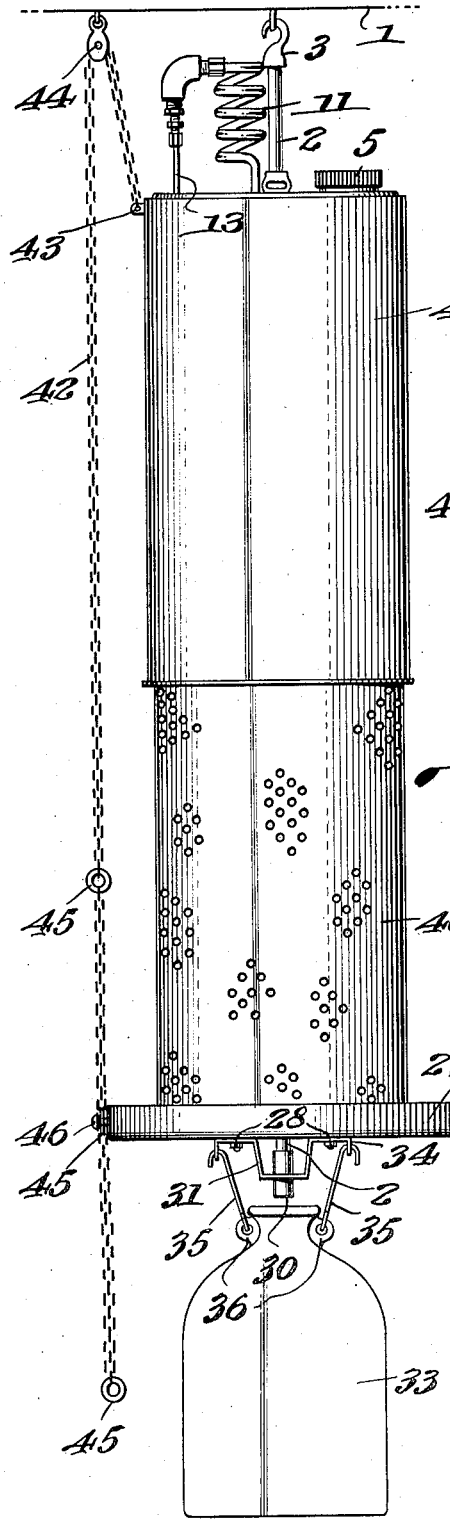
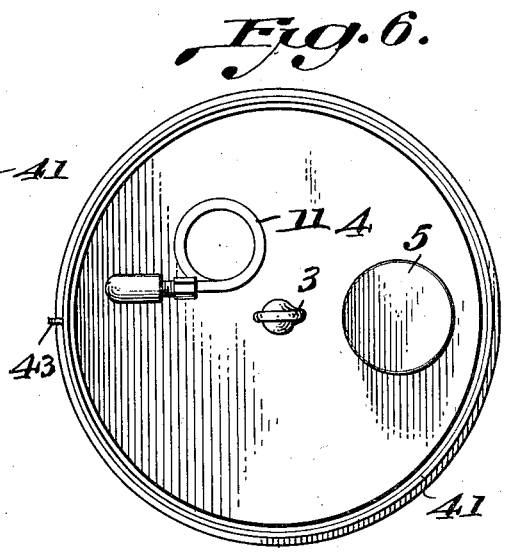
Fig. 6.
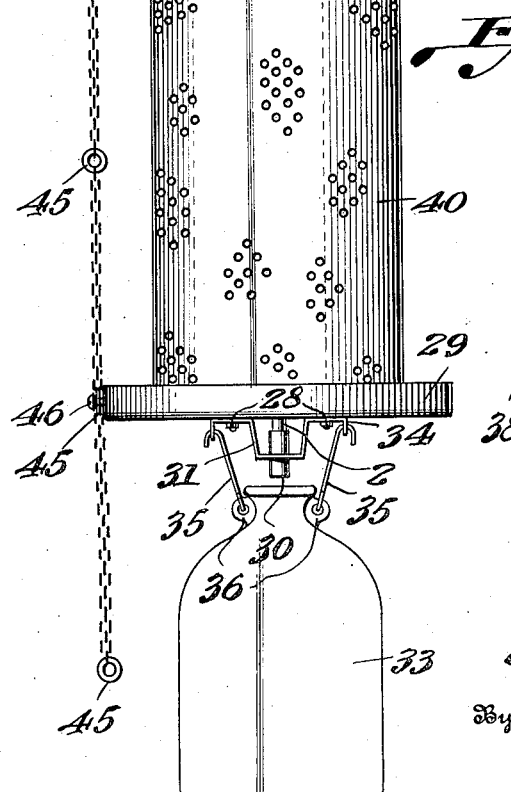
Fig. 1.
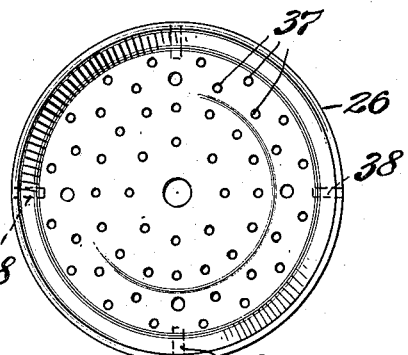
Fig. 7.
Inventor
George E. Poggel
By
Attorney

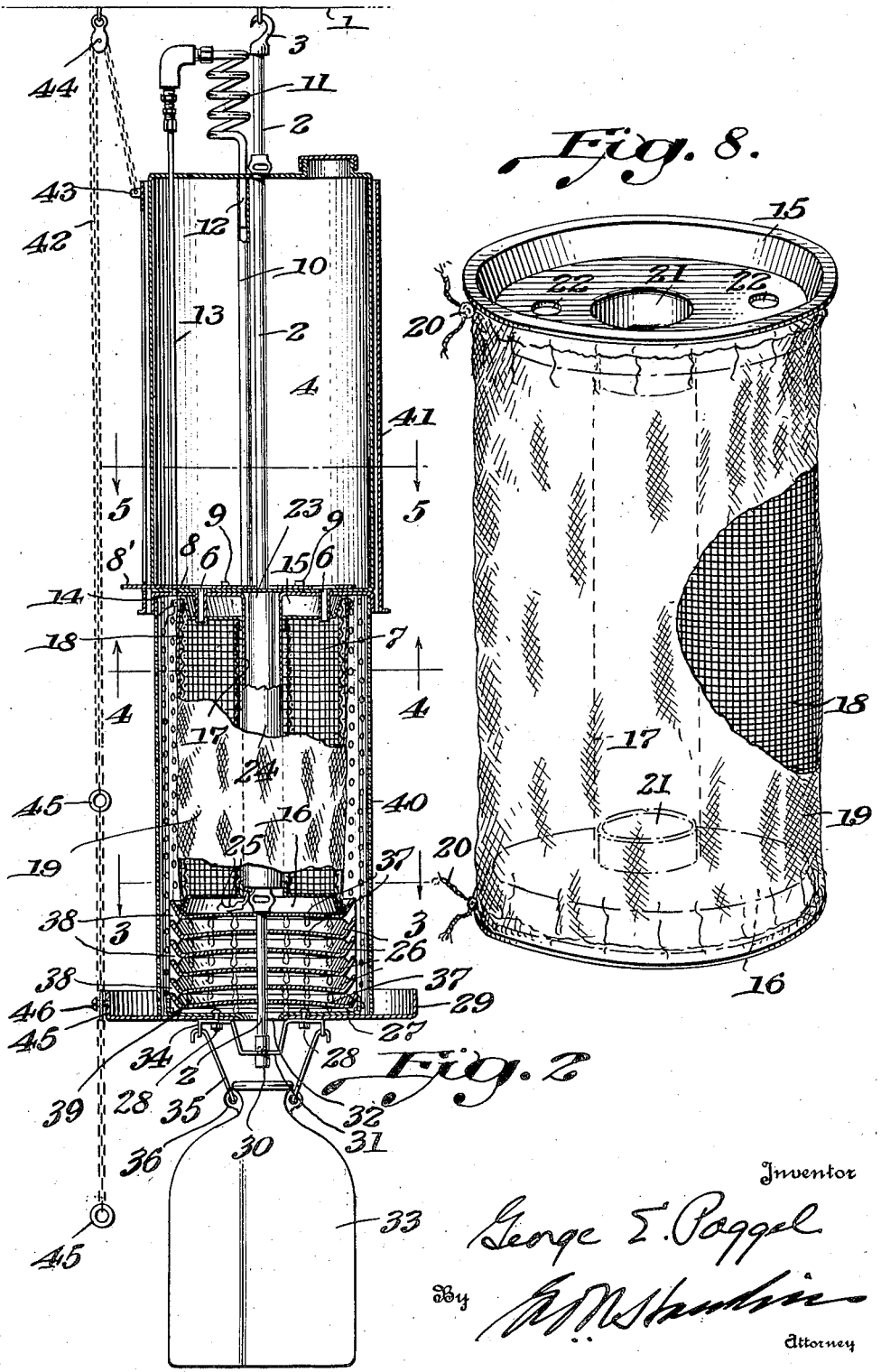

Aug. 1, 1933.  G. E. POGGEL  1,920,915
DEHUMIDIFIER
Filed Feb. 25, 1930   3 Sheets-Sheet 3

Inventor
George E. Poggel
By
Attorney

Patented Aug. 1, 1933

1,920,915

UNITED STATES PATENT OFFICE 1,920,915

DEHUMIDIFIER

George E. Poggel, Louisville, Ky., assignor to Advance Manufacturing Company, Louisville, Ky., a Corporation of Kentucky Application February 25, 1930
Serial No. 431,214

4 Claims. (Cl. 183—4)

The present dehumidifier embodies improvements on the construction and method involved in the dehumidifier disclosed in my application Serial No. 359,063, filed April 29, 1929.

Objects of the present invention are the provision of improvements in the chemical container whereby much of the moisture which would otherwise have access to the chemicals is precipitated and collected without access to the chemicals, thus conserving much of the energy of the chemicals otherwise lost through absorption of moisture; an improved arrangement of precipitating plates or pans combined with the chemical container and the aforesaid improved precipitating means for collecting and holding the deliquesced chemicals which drip from the chemical container, due to long periods of high humidity when the chemicals are not sufficiently dry to take care of the excess moisture, so that a relatively large area of the deliquesced chemicals will then be exposed to the moisture and the very considerable affinity which the solution has for moisture, may be utilized to effect dehumidification of the air at a time when the chemicals in the container will not, ordinarily, take care of the excess moisture present.

The precipitating pans being provided with perforations of relatively small size, the solution or deliquesced chemicals oozes through the perforations in the form of drops, thus affording a much larger and effective absorptive area for the moisture, increasing the efficiency of the operation.

Further objects are the provision of an electrical ring heating unit in lieu of the electric bulb disclosed in my application Serial No. 359,063 and the combination therewith of an enclosing pipe adapted to more uniformly distribute the heat from the unit to the chemicals which are subjected to the heat derived from said heating unit; a reservoir from which fresh chemicals may be fed at will to the chemical container at such periods as the container may need replenishing but without the fresh chemical compounds in the reservoir being subject to the moisture in the air when contained within the reservoir; novel means for increasing or decreasing the effective area of the chemical container and chemicals exposed to the surrounding atmosphere, thereby enabling the chemicals in the container to be conserved, according to the degree of humidity and the requirements of the situation.

Other objects are the provision of an improved dispenser for the reservoir to take care of those short periods when the dew point is raised; a drip collector arranged for attachment to, or removal from, the dehumidifier, whose purpose is to catch the deliquesced chemicals descending from the precipitating pans; and other improvements appearing from the following description and claims.

My dehumidifier has particular utility in printing and lithographing establishments where paper is exposed to constantly changing degrees of humidity, resulting in loss in time and material.

All papers do not act the same, one grade being adapted to withstand a greater amount of humidity than another grade, with satisfactory effects. However, humidity usually fluctuates with temperature and paper acquires its greatest tensile strength with a minimum tendency toward distortion when relative humidity is 45%.

It will be recognized that instead of following the common practice of maintaining a fixed air condition in locations where paper is stored or used in printing or lithographing establishments, it is more economical to provide means adapted to dehumidify, or lower, the degree of humidity.

I have found that it is not necessary to establish a fixed degree of humidity, the main requirement being to prevent the humidity from rising higher than 55%. From 45% minimum representing perfectly dry paper, the paper is not adversely affected, hence from a theoretical minimum, of zero relative humidity to 45% relative humidity, no bad effects are produced upon paper. From 45% upward, paper begins to expand and stretch. In the rise from 45% to 60% relative humidity, the glue and sizing absorb the moisture and stretching gradually occurs to a small extent. From 60% relative humidity upward, stretching of the paper occurs quickly and in more radical form, as the fiber of the paper takes up the moisture.

The present invention, by effecting dehumidification, enables the relative humidity to be kept down to 55% or lower.

Dehumidifiers, according to the present invention, should be located at different points in relation to paper, in printing and lithographing establishments to the end that each unit will effect a substantially correct condition of humidity throughout a given space, a sufficient number of the units or dehumidifiers being used to effect correct humidity percentage throughout the space where the paper is located.

The present invention is not limited to use in connection with establishments dealing with paper, as there are many locations, such as homes, offices, factories, hospitals, auditoriums, school rooms, etc., where health and working conditions are best conserved by maintaining a relatively constant degree of humidity.

While the control of the feed of fresh chemicals to the container is hereinafter described, and is shown in the drawings, as being a manual feed, I wish it to be understood that this feed may be automatically regulated or controlled by a recording hygrometer so that the dehumidifier will be substantially automatic in its operation.

The electrical heating unit employed for the purpose of warming the air carrying the moisture which is attracted by the chemical compound, stimulating the air circulation, and keeping the chemical compound in sufficiently dry condition in order that it may be effective, generates heat at such low temperature that it is not sufficient to effect an appreciable change in temperature although sufficient to keep the chemicals in active, absorbent, condition.

A practical embodiment of the invention is hereinafter described and is shown in the accompanying drawings, in which:

Figure 1 is a side elevation of the complete dehumidifier, the shell being raised to fully expose the chemicals to the atmosphere;

Fig. 2 is a vertical section, certain parts being in full lines, the shell being raised;

Fig. 6 is a plan view of the dehumidifier;

Fig. 7 is a plan view of one of the precipitating pans; and

Fig. 8 is a perspective view of the chemical containing unit, parts being broken away.

Figure 3:
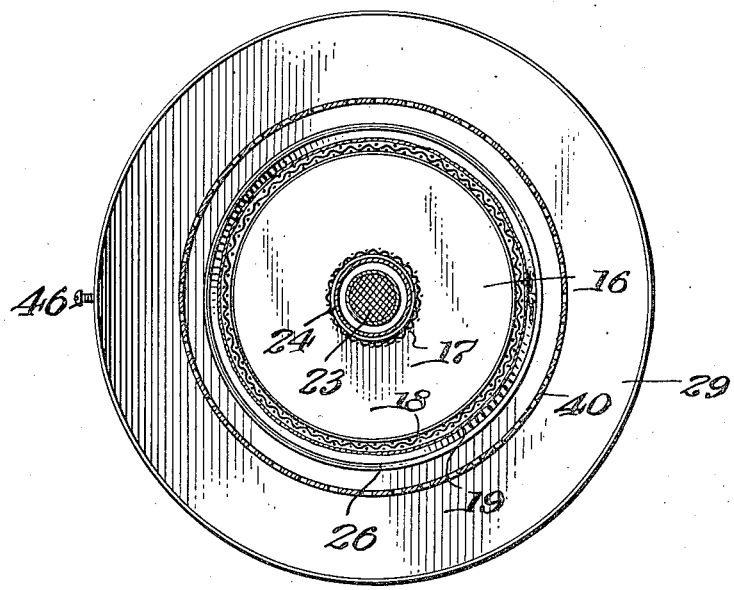
Fig. 3 is a cross section on the line 3—3, Fig. 2.

The complete dehumidifier is sustained or suspended from any suitable support 1 by a rod or tube 2 provided with a hook 3, enabling the apparatus to be hung up or taken down and to be located where desired.

The rod or tube 2 extends all the way through the apparatus and below the bottom so that all of the parts are "strung" thereon and suspended thereby.

The upper part of the apparatus comprises a reservoir 4, having a filling opening 5, which is intended to contain a sufficient supply of the absorbent chemical or chemicals to maintain the apparatus in operation for a relatively long period of time, say one year.

Figures 4, 5:
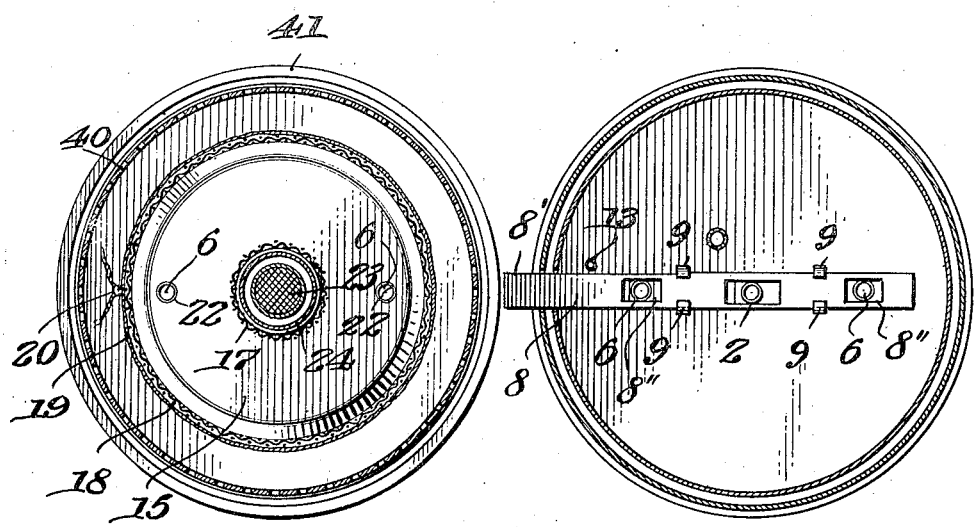
Fig. 4 is a cross section on the line 4—4, Fig. 2.
Fig. 5 is a cross section on the line 5—5, Fig. 2.

Depending from the bottom of the reservoir are two feed tubes 6, 6, arranged so that they will be adapted to discharge into the interior of the chemical container which is shown, generally, at 7. Suitable valve-means 8, shown as an elongated slide valve (Fig. 5) having an operating handle 8', and held by any suitable guiding means 9 on the bottom of the reservoir 4, constitutes the device by which the flow of the chemicals from the reservoir 4 into the interior of the chemical container 7, may be obtained, it being understood that the valve 8 is normally closed, although it is shown in open position in Figs. 2 and 5. Slots 8" in the valve 8 when in register with the tubes 6, permit the chemicals to feed downwardly into the container 7 but when pulled outwardly, the blank parts of the valve overlie the upper ends of the tube 6.

It is within the spirit of my invention to operate the valve 8 automatically by a recording hygrometer, thus rendering it unnecessary to manually take care of the replenishment of the chemicals in the container 7.

As there may be times existing for short periods when the dew point is raised, provision is made to take suitable care of such a condition by a condenser which comprises a tube 10 extending from top to bottom of the reservoir 4, a coil 11 having one end 12 entered into the upper end of the tube 10, and a small tube 13 which extends down through the top and bottom of the reservoir and outside of the chemical container 7, as shown at 14, so that the drip may fall down alongside said container to be taken care of as hereinafter will appear.

The chemical container, which appears in detail in Fig. 8, comprises upper and lower pan-shaped ends 15, 16, inner and outer wire netting, tubular or cylindrical walls 17, 18, and a netted outer fabric or covering 19 which surrounds and encloses the outer wire netting wall 18 and is drawn around the pans 15, 16 and held thereto by suitable means such as draw strings 20. The pans 15, 16 are flanged so that the netted cover 19 will be disposed more or less apart or spaced from the outer cylindrical netting 18 to prevent, so far as possible, contact between the netted fabric 19 and the netting wall 18, it being understood that the netted fabric 19 catches a considerable portion of the moisture which is attracted by the chemicals contained within the container 7 and precipitates a goodly portion of the moisture onto the precipitating pans, hereinafter described, thus conserving much of the energy of the chemicals which, without this netted fabric 19, would have to absorb all of the moisture. The netted fabric 19 thus lengthens the period of activity of the chemicals.

The chemicals, not shown, which are contained within the reservoir 4 and the container 7, are of crystalline form and may comprise such chemicals or chemical compounds as have a capacity for absorbing moisture from the air. Calcium chloride is one such substance. I do not limit myself to any particular chemicals or chemical compounds, although I have found that certain ones are better adapted to the purpose than are others which have moisture-absorbing properties.

The pans 15, 16 have collars 21 engaged with the inner tubular screen or wire netting 17 and the uppermost pan has holes 22 which receive the tubes 6 so that the chemicals within the reservoir may feed directly into the space between the inner and outer screens or nettings 17 and 18 when the valve is operated.

The netted fabric 19 may be of either plain material or treated with oil or varnish but it should not be so thoroughly varnished as to close up its interstices as that would prevent moisture from passing through to the chemicals within the container 7. A light varnish or light oil will suffice, the purpose being to prevent the netted fabric from rotting and also to provide a better condensing surface, while permitting the passage of moisture.

The electrical heating unit 23 which is carried by the pipe or tube 2, is surrounded by a heat distributing tube 24 which provides for uniform distribution of the heat from the heating unit to the chemicals within the container 7 and prolongs the effectiveness of the chemical compound as the dry heat derived from the unit 23 makes dissipation of the chemicals slow and necessitates substitution of fresh chemical compound only at intervals of several months instead of every few weeks. The vapor in the upper pan 15 rises through the tube 10, is condensed by coil 11, and the condensed solution passes down tube 13 and drips out at 14. The terminals of the heating unit are shown at 25 in Fig. 2. It will be understood, however, that as a suitable switch will be provided which will render it possible to step-up or step-down the wattage in order to utilize the full wattage when the humidity is higher during actual operations in the printing or lithographing plant, or, to cut down the wattage and reduce the current consumption during the time the plant is not in operation as at that time, the chemicals can be maintained in effective condition with little heat over a relatively long period of time.

The heating unit 23 and the heat distributor shell 24 are arranged co-axially of the inner tubular netting 17.

Below the chemical container 7 are precipitating pans 26 which may be of porous material, such as earthenware similar to that used in flower pots, or, these pans may be made of impervious material. The pans are arranged in a vertical stack or series, the uppermost one receiving the pan 16 and the lowermost one contained within a circular metal holder 27 which, in turn, is fastened at 28 to a drip pan 29.

The precipitating pans 26 are strung on the lowermost part of the pipe or rod 2 and nuts or other suitable means 30, which are carried by the lower end of the pipe or rod 2, support the entire dehumidifier through a bracket or yoke 31 which is fastened by the bolts 28. The central parts of the pans 27 and 29 have an opening 32 from which the deliquesced chemicals can fall into a glass receptacle 33 which may be conveniently, and detachably; suspended from eye 34 on bracket 31 by hooks 35 carried by ears 36 on said receptacle.

Being of glass, the depth to which the deliquesced chemicals have been deposited in the receptacle 33, enables the attendant to learn whether the receptacle needs to be removed and emptied.

The precipitating pans 26, shown in plan view in Fig. 7, comprising dish-shaped units having numerous relatively small perforations 37 and provided with short legs 38 by which the pans are stacked, one above the other.

The perforations 37 enable the deliquesced chemicals to ooze therethrough from one pan to another, as indicated at 39, in the form of attenuated drops or globules and as these are undergoing formation during deliquescence, there is thus exposed to the surrounding atmosphere, a very greatly increased surface having a certain affinity for moisture despite the deliquescence which has occurred. Thus, these drops or globules, together with the film of solution, constituting the deliquescence, greatly increase the area available for absorption of moisture from the air. While the drier the chemicals, the greater will be the effectiveness thereof to absorb moisture, nevertheless by employing the netted fabric 19 and the precipitating pans 26, the effectiveness of the chemicals is greatly augmented until they finally pass into the receptacle 33.

The pan 29 also affords a container for the deliquesced chemicals.

If desired, the receptacle 33 may be dispensed with and the deliquesced chemicals may be taken off through any suitable conduit to a sewer or other point.

The lower part of the netted fabric 19 being above the uppermost pan 26, much of the moisture is attracted to the dehumidifier by the chemicals in the container 7, is precipitated directly down into the said precipitating pan without reaching the chemicals.

Where long periods of high humidity prevail, the chemicals contained within the container 7, are inclined to break down more quickly than they are treated by the heating unit 23 and they deliquesce into a heavy solution which possesses considerable chemical affinity for attracting moisture. This property of the deliquesced chemicals is availed of by the pans 26, as previously described.

In the course of time, say several months, valve 8 may be opened sufficiently to admit fresh chemicals from reservoir 4 into container 7.

To protect the active elements of the dehumidifier, they are surrounded by a stout cylindrical perforated metal shell 40 which is secured at its upper end but merely rests against the pan 29 at its lower end, permitting the precipitating pan 26, the container 7, and other parts to be removed downwardly through the bottom of said shell 40, when desired.

To provide for regulation and to conserve the chemicals within container 7 according to requirements, the dehumidifier is equipped with a regulating shell 41 which may be elevated to the position shown in Figs. 1 and 2, or lowered to surround as much of the snell 40 as necessary to effect the desired cut-off. Any suitable means may be employed for raising and lowering the shell 41; one such means comprises a chain 42 connected to the shell at 43, running from a pulley 44, attached to the support 1 and provided with rings, hooks, or other suitable means 45 adapted to be engaged with a member 46 on the pan 29.

It will be understood that the shell 41 completely surrounds the reservoir 4 when it is raised, and also surrounds the shell 40, and the parts contained therein, when it is lowered to the desired extent. The shell 41 may be let down so that it will abut the bottom of the pan 29, if desired, thereby cutting off the inflow of all air to the dehumidifier except such as has access through the opening 32.

What I claim is:

1. In a dehumidifier, the combination with an air-pervious container for holding and exposing chemicals having moisture-absorbing property, of a moisture-absorbing and precipitating fabric cover enclosing said container adapted to preliminarily relieve the air of moisture before the air has access to the pervious container for the chemicals, and means disposed below the container to receive, and expose outside of the air pervious container, the gravitating deliquescence of the aforesaid chemicals to enable further absorption of the moisture from the air outside of the container to be obtained by the utilization of said deliquesced chemicals.

2. In a dehumidifier, the combination with an air-pervious container for holding and exposing chemicals having moisture-absorbing property, of a chemical holding reservoir arranged in end to end relationship therewith from which chemicals may be fed to the container. and a tubular shell slidable on the reservoir and adapted to telescope over the container, or the reservoir, or both of them, whereby the effective area exposed to the air by the air-pervious container may be varied as desired.

3. In a dehumidifier, the combination with an air-previous container for holding and exposing chemicals having moisture-absorbing property, of a chemical-holding reservoir adapted for feeding chemicals to the container, a moisture-precipitating fabric surrounding the air-previous chamber, and means controlling the feed of the chemicals from the reservoir to the container.

4. In a dehumidifier, the combination with an outer air-pervious shell, of an air-pervious container for holding and exposing chemicals having moisture-absorbing property, and an air-pervious fabric cover for said chemical container, said chemical container and fabric being located inside of the outer shell, an electrical heating unit located inside of the chemical container, a series of perforated drip trays located below the chemical container and within the outer air-pervious shell, said trays being adapted to catch the deliquescence descending from the chemicals and to cause the deliquescence to pass in the form of drops or globules from tray to tray, a deliquescence receptacle located below the trays, a chemical reservoir located above the chemical container, means whereby the chemicals may be delivered from the reservoir to the chemical container by a gravitating action, and a shell adapted to telescope in respect to the outer shell and the chemical container for the purpose of regulating the flow of the air.

GEORGE E. POGGEL.